United States Patent
Shibayama

(10) Patent No.: US 7,162,074 B2
(45) Date of Patent: Jan. 9, 2007

(54) ADJUSTING APPARATUS FOR STEREOSCOPIC CAMERA

(75) Inventor: Norifumi Shibayama, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 736 days.

(21) Appl. No.: 10/298,356

(22) Filed: Nov. 18, 2002

(65) Prior Publication Data

US 2003/0095178 A1    May 22, 2003

(30) Foreign Application Priority Data

Nov. 20, 2001 (JP) ............... 2001-354994
Nov. 20, 2001 (JP) ............... 2001-354995

(51) Int. Cl.
*G06K 9/00* (2006.01)
*H04N 13/00* (2006.01)

(52) U.S. Cl. ........................ 382/154; 348/42
(58) Field of Classification Search ............... 382/274
See application file for complete search history.

(56) References Cited

U.S. PATENT DOCUMENTS 6,111,596 A * 8/2000 Haskell et al. ............... 348/42
6,320,626 B1 * 11/2001 Lee ............................ 348/687

FOREIGN PATENT DOCUMENTS

| EP | 0 933 646 A2 | 8/1999 |
| EP | 1 081 504 A2 | 3/2001 |
| JP | 07-050856 | 2/1995 |
| JP | 2000-078435 | 3/2000 |
| JP | 200-111321 | 4/2000 |
| JP | 2000-341719 | 12/2000 |
| JP | 2001-069402 | 3/2001 |

OTHER PUBLICATIONS

Office Action Issued Aug. 1, 2006 for Japanese patent Application 2001-354994.

* cited by examiner

*Primary Examiner*—Joseph Mancuso
*Assistant Examiner*—Hadi Akhavannik
(74) *Attorney, Agent, or Firm*—Darby & Darby

(57) ABSTRACT

An adjusting apparatus for adjusting a brightness balance between a pair of images taken by a stereoscopic camera, comprises an offset amount adjusting means for adjusting a brightness offset of the images and an offset deviation adjusting means for adjusting a deviation of the brightness offset between the pair of images by correcting the brightness offset based on a difference of brightness distribution between the pair of images.

3 Claims, 6 Drawing Sheets

ADJUSTING APPARATUS FOR STEREOSCOPIC CAMERA

The disclosure of Japanese Patent Application No. 2001-354994 filed on Nov. 20, 2001, and Japanese Patent Application No. 2001-354995 filed on Nov. 20, 2001 including the specifications, drawings and abstracts is incorporated herein by reference in its entirety.

BACKGROUND OF THE INVENTION

1. Field of the Invention

The present invention relates to an adjusting apparatus of a stereoscopic camera and more particularly to an adjusting apparatus for adjusting a brightness difference between a pair of stereoscopic images.

2. Discussion of prior art

Generally, a stereoscopic image processing in which a pair of cameras take a picture image of an object from different positions, respectively and a distance to the object is obtained from a parallax between two cameras on the paired picture images based on a position where the cameras are installed and parameters such as a focal distance of the camera according to the principle of a triangulation, is known.

In this stereoscopic image processing, the parallax between two cameras with respect to the object is obtained when two image signals are overlapped and coincide with each other, while two image signals are shifted one by one. It is preferable that there is no deviation except for the parallax between two images and it is required that the balance of optical characteristics and the balance of signal characteristics are secured between those two cameras.

In Japanese Patent Application No. Toku-Kai 2001-69402, the applicant of the present invention proposes a technique in which the brightness balance between respective images of the stereoscopic camera is adjusted by correcting a gain of an amplifier so as to minimize the difference between a first evaluation value representing a magnitude of overall brightness of a first window provided in one image of the stereoscopic camera and a second evaluation value representing a magnitude of overall brightness of a second window provided in the other image of the stereoscopic camera.

However, generally, the two cameras constituting the stereoscopic camera have dispersions in their characteristics respectively and have a different direct current component in output signals of the respective cameras. As a result, sometimes a black level which is a reference value in processing images disagrees between the paired image signals. The disagreement of the black level means that the respective images after A/D conversion have a different brightness level and there is a brightness offset deviation between images. The brightness offset deviation can not be deleted by simply adjusting gains of an amplifier as the prior art does and this has been an obstacle in enhancing the accuracy of stereoscopic image processing.

SUMMARY OF THE INVENTION

It is an object of the present invention to provide an adjusting apparatus of a stereoscopic camera capable of deleting a brightness offset deviation between images and raising the accuracy of stereoscopic image processing.

An adjusting apparatus for adjusting a brightness balance between a pair of images taken by a stereoscopic camera, comprises an offset amount adjusting means for adjusting a brightness offset of the images and an offset deviation adjusting means for adjusting a deviation of the brightness offset between the pair of images by correcting the brightness offset based on a difference of brightness distribution between the pair of images. The difference of brightness distribution is represented by a deviation of brightness in a lateral direction of histograms of the paired images with respect to brightness. The deviation is converted into a correction amount of a clamp value and the correction amount is outputted to a clamp circuit to equalize the brightness balance between images.

DESCRIPTION OF PREFERRED EMBODIMENT

Figure 1:
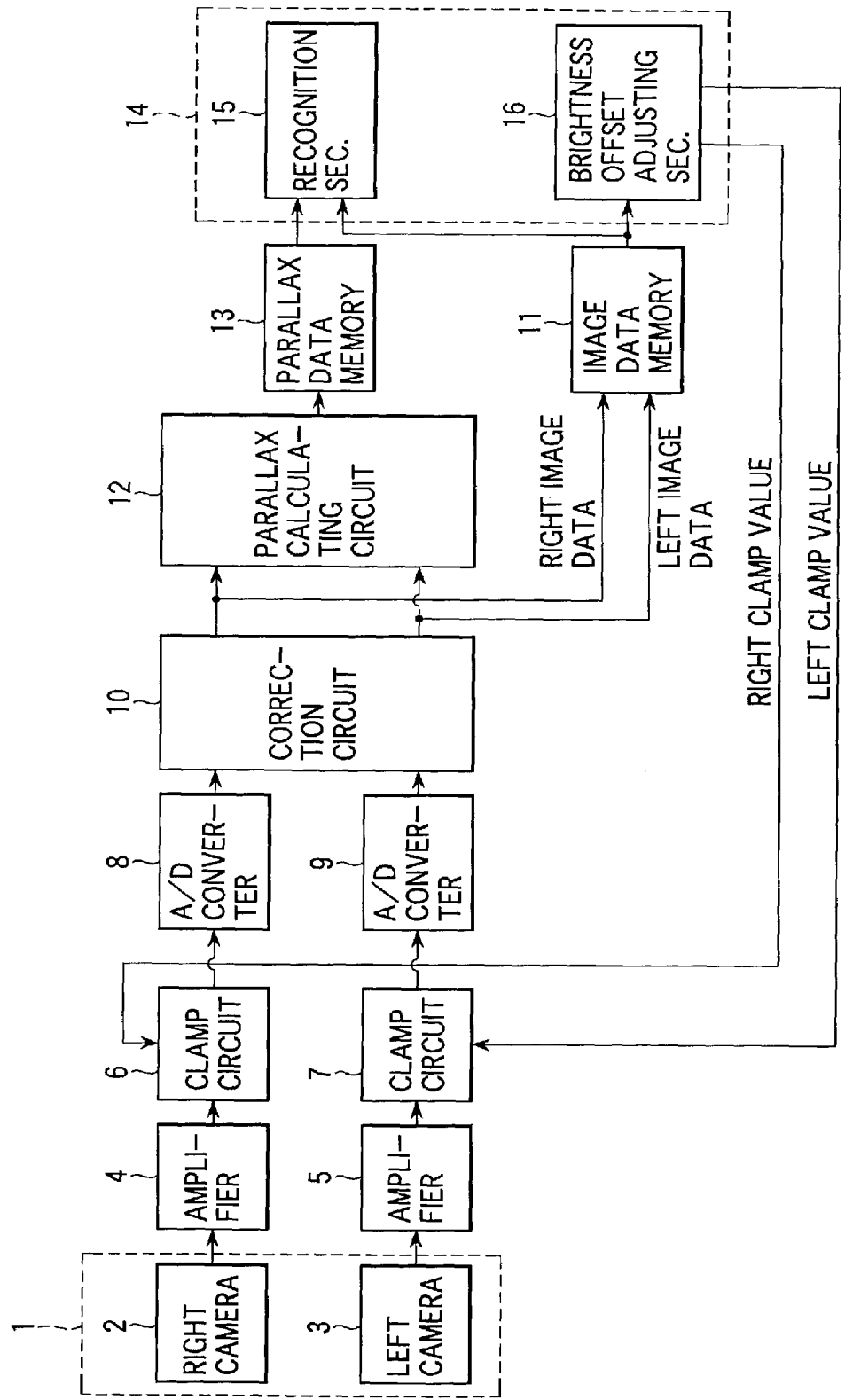
FIG. 1 is a block diagram showing a construction of a stereoscopic image processing system according to a first embodiment of the present invention.

Referring now to FIG. 1, numeral 1 denotes a stereoscopic camera constituted by two cameras 2,3 incorporating image sensors such as a charge coupled device (CCD) and the like and synchronized with each other. For example, the cameras 2 and 3 may be designated as a right camera, a left camera respectively. The cameras 2, 3 are attached to stays (not shown) extending from a vehicle body with a specified base length. An image taken by one camera is referred to as a base image and an image taken by the other camera is referred to as a comparison image.

The respective cameras 2, 3 are connected with amplifiers 4, 5 for proportionally amplifying image signals from the respective cameras 2, 3. Further, the amplifiers 4, 5 are connected through clamp circuits 6, 7 with A/D converters 8, 9 respectively. Analogue images taken by the respective cameras 2, 3 are converted into digital images having a specified number of gradations (for example, 256 gradations in gray scale). The clamp circuits 6, 7 serve as a level adjusting means for fixing (clamping) a black level of respective image signals outputted from the amplifiers 4, 5 to regulate the black level within a voltage range needed for A/D conversions. A reference voltage value when an A/D conversion is performed in the A/D converters 8, 9 can be established from outside. The reference voltage value is a voltage value of the black level and brightness is regarded as 0 (zero) when the output voltage is lower than the reference voltage value.

That is, the clamp circuits 6, 7 raise or lower a brightness offset value, namely a clamp value of the black level based on the indication from outside so as to equalize brightness levels of left and right images. As a result, a deviation between the brightness offset values of the left and right images can be deleted. In this first embodiment, the clamp value given to the clamp circuit 7 on the left image side can be varied so as to equalize the brightness level of the left image with that of the right image.

The left and right images digitalized in the A/D converters 8, 9 are inputted to a correction circuit 10 and are subjected to corrections such as a shading correction, a log correction, a geometrical correction (correction with respect to optical deviations of the cameras 2, 3) and the like. After that, the left and right digital image data are stored in an image data memory 11 and at the same time those image data are inputted to a parallax calculating circuit 12 wherein a stereo matching is performed. The stereo matching is a process in which an identical object imaged on the left and right images is searched for every specified small region of a picture image to obtain a parallax of the object between the left and right images. Further, the parallax data thus obtained by the stereo matching process are stored in a parallax data memory 13.

As well known, the identical object imaged on the left and right images (stereoscopic images) lies on an epipoler line (a line in parallel with a line connecting both optical centers of the left and right cameras 2, 3) and a deviation amount on the epipoler line between respective positions of the object on the left and right images represents a distance to the object. Therefore, in the parallax calculating circuit 12, a correlation between a small region on the base image and a small region on the comparison image is evaluated while the small region on the comparison image is shifted in a lateral direction pixel by pixel.

The correlation between the small regions can be evaluated by calculating a city block distance. That is, establishing a coordinate system composed of a lateral axis i and a vertical axis j with an origin of the coordinates placed at the left above corner of the image, and letting a small region be a region of 4×4 pixels, the city block distance Z is ($\Sigma|Ai,j-Bi,j|$: $i,j$=0 to 3) where $Ai,j$ is a brightness of a coordinate (i, j) on the base image and $Bi, j$ is a brightness of a corrdinate (i, j) on the comparison image. When the city block distance is minimum, the respective small regions are positions corresponding to an identical object on the same sight line. The deviation amount between corresponding small regions is outputted as parallax data representing the distance to the object. The construction and operation of the hardware circuit for calculating the city block distance and producing the parallax data are described in detail in Japanese Patent Application Laid-open No. Toku-Kai-Hei 5-114099.

The pair of original left and right images stored in the image data memory 11 and the parallax data stored in a parallax data memory 13 are inputted to an image processing apparatus 14 and are subjected to miscellaneous image processings therein. The image processing apparatus 14 are constituted mainly by a micro computer and other interface circuits, functionally including a recognition section 15 in which the position of an own vehicle and surrounding circumstances are recognized based on the original left and right images of the image data memory 11 and on the parallax data of the parallax data memory 13, and a brightness offset adjusting section 16 in which clamp values with respect to the clamp circuits 6, 7 are calculated based on the original left and right images of the image data memory 11 to adjust the deviation of the brightness offset between the left and right images.

The adjustment of the deviation of the brightness offset in the brightness offset adjusting section 16 is a software process in which a brightness distribution is obtained for the respective paired images taken by the stereoscopic camera 1 and respective reference voltage values of the clamp circuits 6, 7 are adjusted based on the difference of brightness distribution between the respective images. In more detail, as described below, a brightness histogram is prepared for the respective paired images, a deviation of the respective brightness histograms in a direction of a brightness axis is obtained, the deviation is converted into the adjustment value of the reference voltage value and finally the sum of the adjustment value and the present clamp value is outputted as a corrected clamp value.

Figure 2:
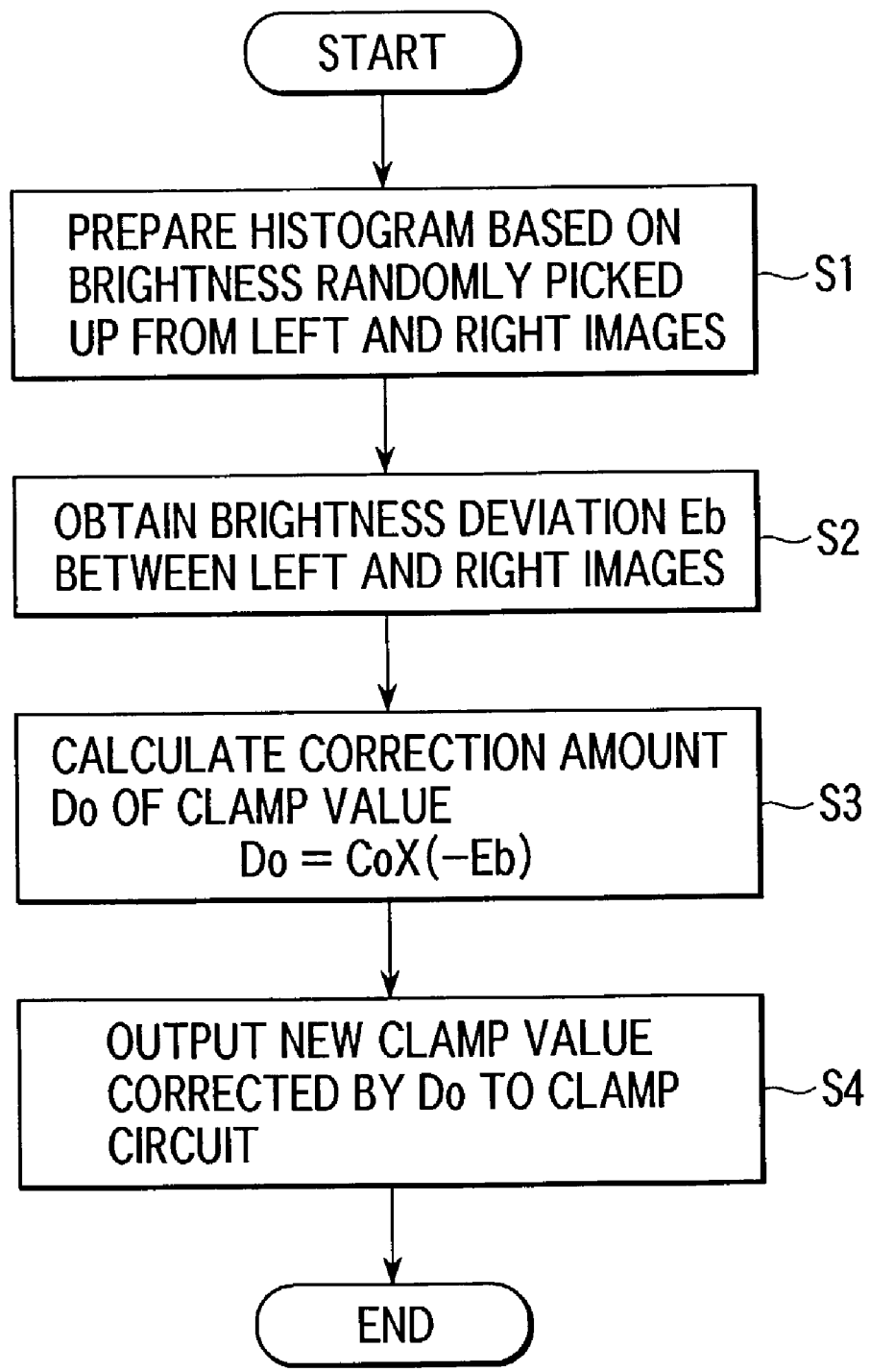
FIG. 2 is a flowchart of a brightness offset adjusting processing.

The brightness offset adjusting section 16 realizes a function as a brightness offset adjusting means and specifically a function of the brightness offset adjusting means is realized by executing processes as shown in FIG. 2.

Below, the brightness offset adjusting process in the brightness offset adjusting section 16 will be described by reference to a flowchart of FIG. 2.

Figure 3:
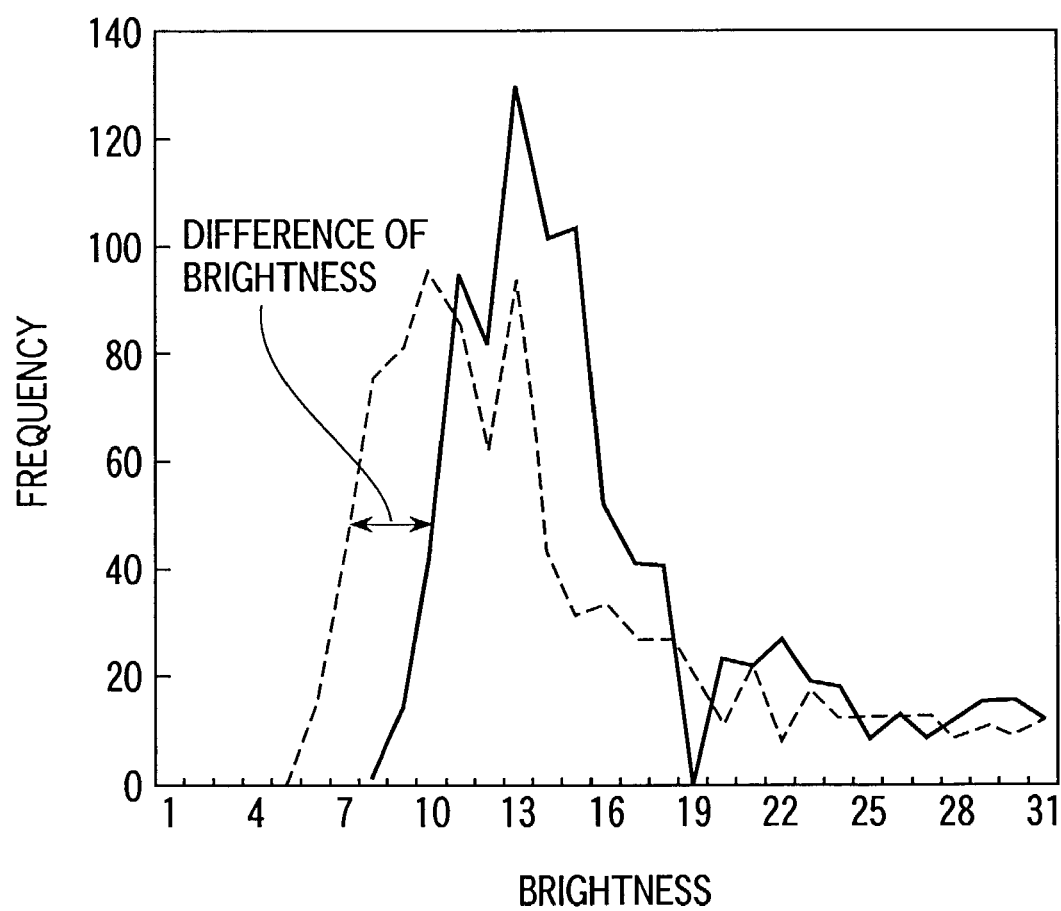
FIG. 3 is an explanatory view of a brightness histogram.

First, at a step S1, in order to investigate brightness distributions of the left and right images stored in the image data memory 11, picking up N pieces (for example, 1024 pieces) of pixel at random from the respective left and right images, a histogram is prepared for each of the left and right images based on brightnesses of pixels picked up. FIG. 3 shows an example of the prepared histogram. In a coordinate having an abscissa representing brightness and an ordinate representing frequency, a curve in solid line expresses a brightness histogram of the left image and a curve in broken line expresses a brightness histogram of the right image.

Next, the program goes to a step S2 where a lateral deviation between the respective histograms of the left and right images is obtained. With respect to the process of the step S2, miscellaneous methods are known. For example, while shifting one of the left and right histogram curves in a direction of the abscissa, the amount of the shifting when the sum of the absolute value of the frequency difference from the other histogram curve is minimal is searched. Thus obtained lateral deviation represents a difference of the entire brightness level between the left and right images, that is, a deviation of brightness offset between the left and right images. Letting the deviation value of brightness offset be Eb, the brightness deviation value Eb is defined as "positive" when the left image is brighter than the right image.

Then, the program goes to a step S3 where the brightness deviation value Eb is converted into an a correction amount Do of the clamp value. This conversion is executed according to the following formula:

$$Do = Co \times (-Eb)$$

where Co is a constant determined according to characteristics of the clamp circuit 7 and the A/D converter 9, expressing a ratio of an increment of clamp value to an increment of brightness ($\Delta$clamp value/$\Delta$brightness).

After that, the program goes to S4 where a sum of the current clamp value and the correction amount Do is outputted to the clamp circuit 7 on the left image side and the process finishes. As a result, the clamp level with respect to the output of the amplifier 5 is corrected so as to delete the deviation of the brightness offset between left and right images and the brightness level A/D converted in the A/D converter 9 of the left image is adjusted to the same level as the brightness level A/D converted in the A/D converter 8 of the right image.

In case where the clamp value after being added by the correction amount Do exceeds an adjustment range of the clamp circuit 7, the current clamp value of the clamp circuit 6 on the right image side is reduced by the correcting value Do in place of changing the clamp value of the clamp circuit 7 on the left image side. As a result, the clamp level of the right image is lowered and the deviation of the brightness offset between the left and right images is adjusted.

According to the first embodiment of the present invention, the deviation of the brightness offset between the paired images of the stereoscopic camera can be automatically deleted and the accuracy of stereoscopic image processing can be enhanced. The effect of the invention is large particularly in dark situations such as nights.

Figure 5:
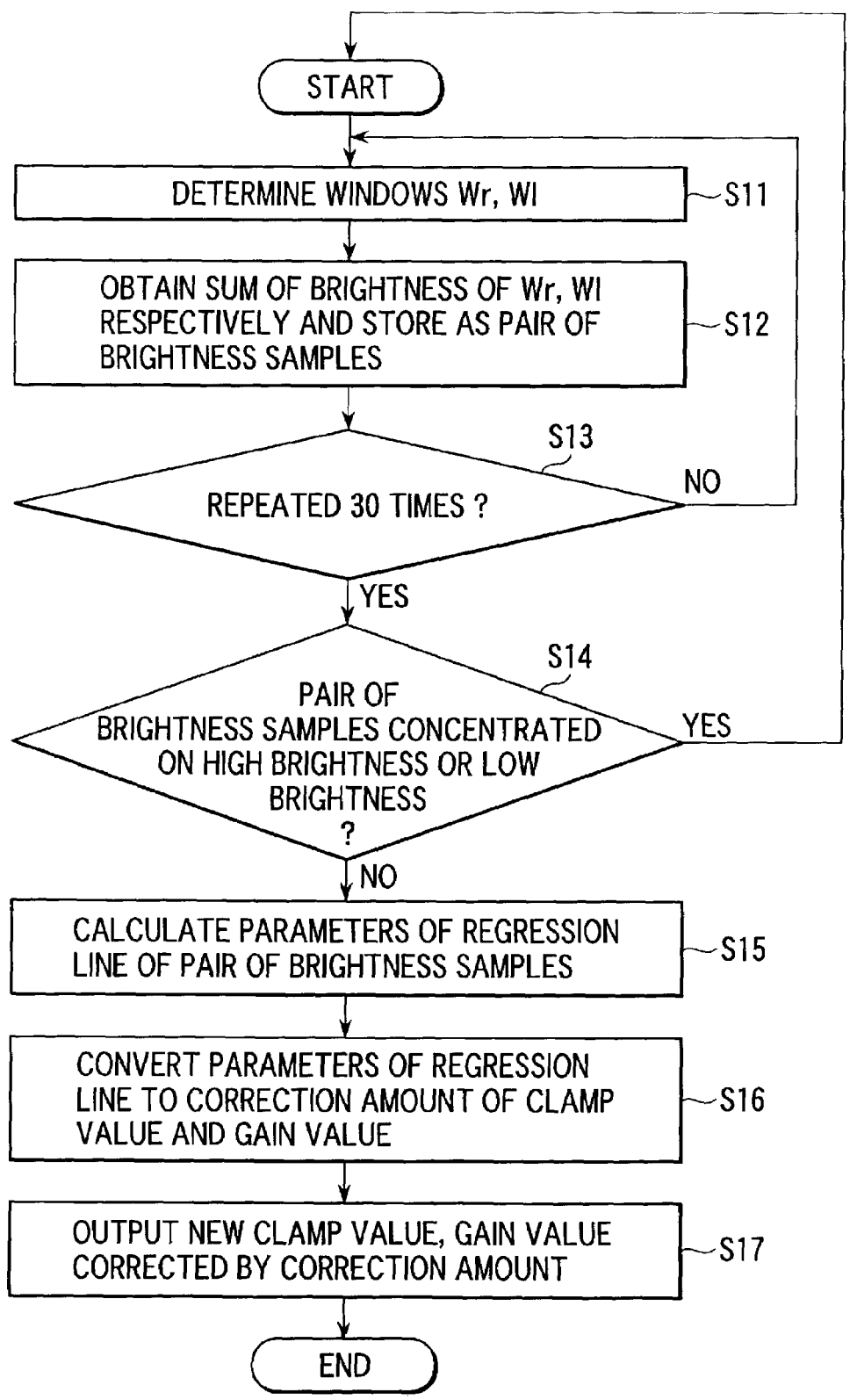
FIG. 5 is a flowchart showing a brightness gain and offset adjusting processing.
Figure 6:
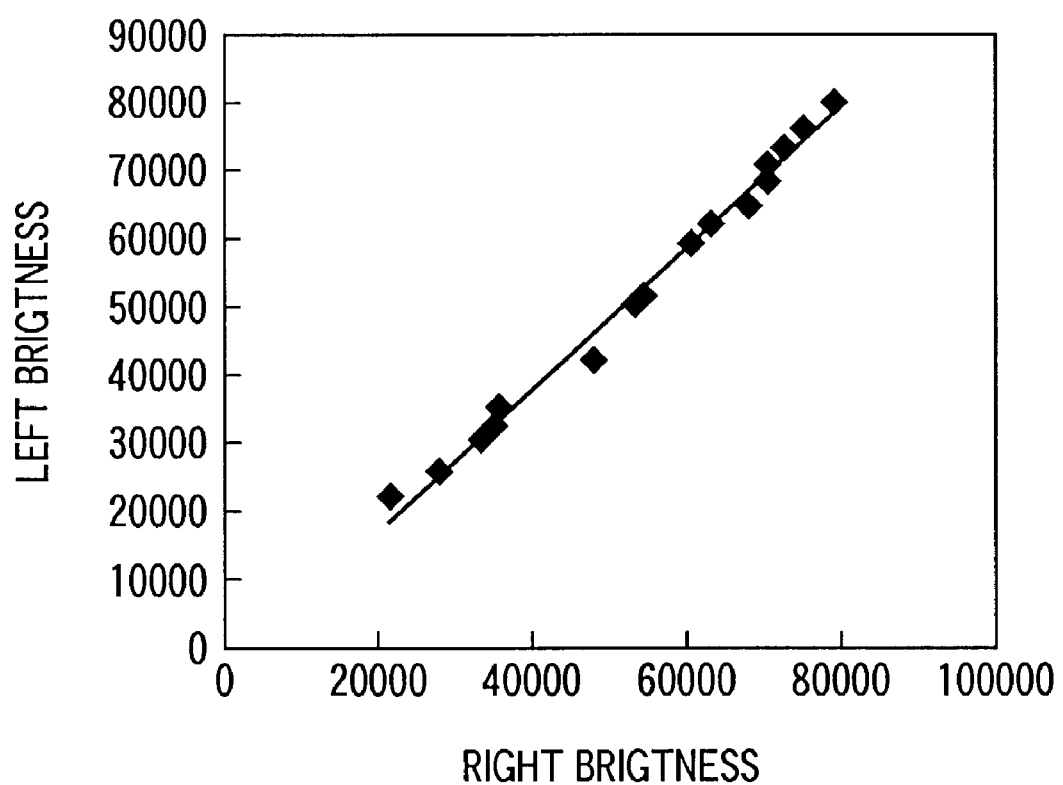
FIG. 6 is an explanatory view showing a distribution of paired brightness samples and a regression line.

Next, a second embodiment of the present invention will be described by referring to FIG. 4 to FIG. 6.

Figure 4:
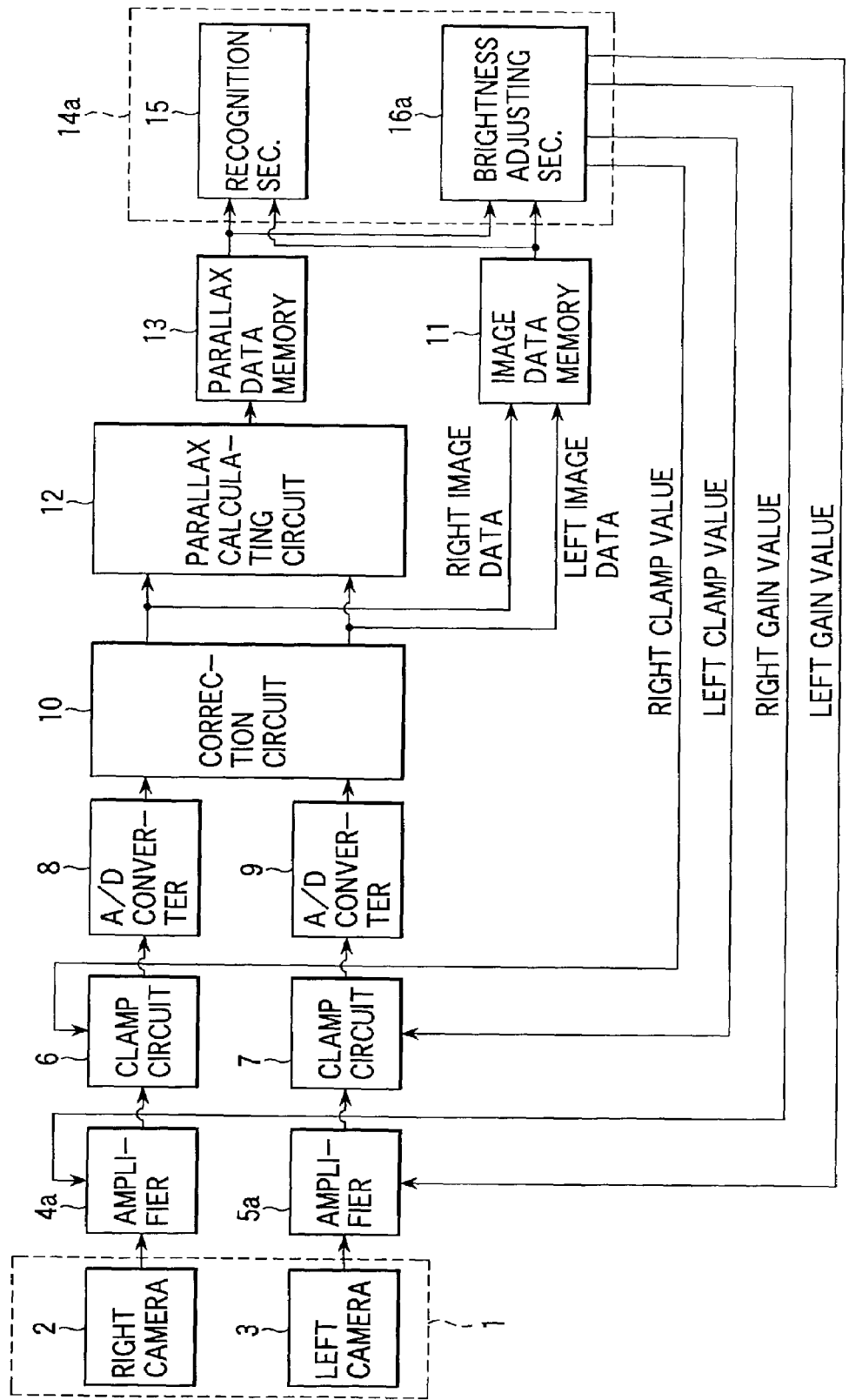
FIG. 4 is a block diagram showing a construction of a stereoscopic image processing system according to a second embodiment of the present invention.

Referring to FIG. 4, blocks denoted by the same reference numbers as those in FIG. 1 have identical functions and therefore duplicate descriptions will be omitted.

The pair of original left and right images stored in the image data memory 11 and the parallax data stored in a parallax data memory 13 are inputted to an image processing apparatus 14a and are subjected to miscellaneous image processings therein. The image processing apparatus 14a are constituted mainly by a micro computer and other interface circuits, functionally including a recognition processing section 15 in which the position of an own vehicle and surrounding circumstances are recognized based on the original left and right images of the image data memory 11 and on the parallax data of the parallax data memory 13, and a brightness adjusting section 16a in which gains for amplifiers 4a, 5a and the clamp values for the clamp circuits 6, 7 are calculated based on the left and right original image data of the image data memory 11 to adjust the brightness balance of the left and right images. In this embodiment, the gains of the respective amplifiers 4a, 5a can be varied from outside.

Describing the adjustment of the brightness balance in the brightness adjusting section 16a, a first evaluation window is established in one image of the left and right images, a second evaluation window having a correlation with a brightness characteristic of the first evaluation window is established in the other image of the left and right images and a plurality of paired samples of an evaluation value representing the magnitude of an overall brightness of the first evaluation window and an evaluation value representing the magnitude of an overall brightness of the second evaluation window, are calculated. Further, a regression line with respect to the distribution of the paired samples is obtained and the brightness gain and the reference voltage of the black level are corrected simultaneously such that this regression line is a proportional line passing through an origin. Thus, the difference of brightness gains and the deviation of brightness offsets between the left and right images can be deleted simultaneously and as a result the brightness of the respective images can be equalized.

That is, the brightness adjusting section 16a have two functions as a paired evaluation samples calculating means and a brightness balance adjusting means. Specifically, these means are realized by executing processes shown in FIG. 5. Below, the brightness adjusting processing in the brightness adjusting section 16a will be described by reference to FIG. 5.

Describing the brightness offset adjusting processing, first, at a step S11, left and right original image data are read from the image data memory 11 and a window Wr composed of H pixels laterally×V pixels vertically (for example, 20 pixels×20 pixels) is cut out at random from the right image. This window is referred to as a first evaluation or a right window. Then, a window W1 having a highest brightness correlation with the first evaluation window Wr is cut out from the left image. This window W1 is referred to as a second evaluation window or a left window.

The left window W1 having the highest brightness correlation with the right window Wr is determined by a technique disclosed in Toku-Kai 2000-69402 filed by the applicant of the present invention. Since the method of the determination is described in detail in Toku-Kai 2000-69402, only a fundamental method will be described next. First, parallax data of a region corresponding to the right window Wr are read from the parallax data memory 13 and a value having a highest frequency in a histogram of the parallax data or an averaged value of the parallax data is obtained as a parallax representative of the right window Wr. Further, the left window W1 having the same size as the right window Wr is established in a position horizontally offset by the representative parallax of the left image. Otherwise, a region having a highest correlation with the right window Wr can be identified in the left image by performing a stereo matching while shifting pixel by pixel on a epipoler line of the left image.

After the right window Wr and the left window W1 having a highest brightness correlation with the right window Wr are determined, the program goes from the step S11 to a step S12 where a total sum of the brightness values of the right window Wr, namely, an evaluation value (total brightness) of the right window Wr and a total sum of the brightness values of the left window WI, namely, an evaluation value (total brightness) of the left window WI are calculated respectively. Then, a pair of the left and right evaluation values (hereinafter, referred to as "paired evaluation samples") are memorized in a memory. Next, the program goes to a step S13 where it is checked whether or not these processes of S11, S12 are repeated N times (for example 30 times). In case where numbers of the repetition are smaller than N, the processes of S1, S2 are continued. In case where the number of the repetition reaches N, the program goes to a step S14 where a distribution of the paired evaluation samples memorized in the memory is checked.

As a result, at the step S14, in case where it is judged that the distribution is biased on a high brightness side or a low brightness side, all N pieces of the paired evaluation samples are deleted and the program returns to the step S11 from which the same processes are done over again. It is judged as follows whether or not the paired evaluation samples are concentrated on the high or low brightness sides. A theoretical maximum value of either the right date or the left data of the paired brightness samples is the number of pixels of the window x the number of gradations (in this embodiment 20×20 pixels×256 gradations=102400). All of the right data of the N paired samples are compared with a reference value (in this embodiment half of 102400=51200). If all of the right data of the N paired samples are larger than the reference value, or if all of the right data of the N paired samples are smaller than the reference value, it is judged that the distribution is biased.

At the step S14, in case where it is judged that the paired evaluation samples are biased neither on the high brightness side nor on the low brightness side, the program goes from the step S14 to a step S15 where parameters (gradient a, intercept b) of a regression line when the N paired brightness samples are plotted on a graph of right brightness versus to left brightness are calculated by the least square method for example. Representing right brightness on an abscissa and representing left brightness on an ordinate, further letting left and right brightness be Br, B1 respectively, the regression line is expressed as a formula (1).

$$B1 = a \times Br + b \tag{1}$$

Next, the program goes to a step S16 where a correction amount Do of the clamp value in the clamp circuit 7 for the left image and a correction amount Dg of the gain value in the amplifier 5a for the left image are calculated respectively from the regression line according to the formula (1). Specifically, the correction amounts are obtained such that the regression line becomes a proportional line (Bl=Br with gradient a=1) passing through the origin, that is, such that the brightness gain and the brightness level of the left image coincide with those of the right image, respectively. The correction amounts Do, Dg are expressed as:

$$Do = Co \times (-b) \quad (2)$$

$$Dg = Cg \times ((-a) \times 255) \quad (3)$$

where Co, Cg are constants determined by characteristics of the amplifier 5a, the clamp circuit 7 and the A/D converter 9. that is, the constant Co expresses a ratio of an increment of clamp value to an increment of brightness (Δclamp value/Δbrightness) and the constant Cg expresses a ratio of an increment of gain value to an increment of brightness (Δgain/Δbrightness in the vicinity of a maximum brightness); 255 is a maximum value of brightness.

After the correction amounts Do, Dg are calculated, the program goes to a step S17 where an indicating value representing a sum of the present gain value and the correction amount Dg and an indicating value representing a sum of the present clamp value and the correction amount Do are outputted to the amplifier 5a and the clamp circuit 7 for the left image, respectively and the program ends.

As a result, the gain of the amplifier 5a for the left image and also the clamp value of the clamp circuit 7 for the left image are corrected so as to delete the difference of brightness and the deviation of brightness offset between the left and right images. That is, the brightness gain of the left image after passing through the amplifier 5a is adjusted so as to coincide with the brightness gain of the right image after passing through the amplifier 4a. Further, the brightness level A/D converted in the A/D converter 9 after passing through the clamp circuit 7 of the left image is adjusted to the same level as the brightness level AID converted in the A/D converter 8 after passing through the clamp circuit 6 of the right image.

In case where the indicating values exceed an adjustable range determined by specifications of respective circuits, instead of changing the gain and clamp values on the left image side, the gain and clamp values on the right image side may be changed by reducing the indicating values from the respective present values to adjust the brightness balance of the left and right images.

Thus, in accordance with this second embodiment, it is possible to automatically and simultaneously delete the difference of brightness gain due to the dispersion of outputs of two cameras constituting the stereoscopic camera and the deviation of brightness offset due to the dispersion of direct current signal levels between the paired images and whereby the brightness of respective positions imaging an identical object can be equalized between the left and right images. As a result, more correct stereo matchings becomes available, these raising the accuracy of detecting distances and enabling more accurate image recognitions.

The disclosures of Japanese Patent Applications No. Tokugan 20001-354994 and No. Tokugan 2001-354995 including the specification, drawings and abstract are incorporated herein by reference.

While the present invention has been disclosed in terms of the preferred embodiments in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

What is claimed is:

1. An adjusting apparatus for adjusting a brightness balance between a pair of images taken by a stereoscopic camera, comprising: gain adjusting means for adjusting a brightness gain of said pair of images; offset level adjusting means for adjusting a brightness offset amount of at least one of said pair of images; first evaluation window establishing means for establishing a first evaluation window in one of said images; second evaluation window establishing means for establishing a second evaluation window having a brightness correlation with said first evaluation window in the other image; paired evaluation samples calculating means for calculating a plurality of paired evaluation samples of an evaluation value representing a magnitude of an overall brightness of said first evaluation window and an evaluation value representing a magnitude of an overall brightness of said second evaluation window; and brightness balance adjusting means for adjusting a brightness balance between said images by correcting said brightness gain and said brightness offset amount so as to reduce a difference between said evaluation values, wherein said brightness balance adjusting means includes means for obtaining a regression line based on a distribution of said paired evaluation samples and for correcting said brightness gain and said brightness offset amount such that said regression line is a proportional line having a gradient=1 and passing through an origin.

2. The adjusting apparatus according to claim 1, wherein said brightness offset is adjusted by adjusting a reference voltage of a black level.

3. The adjusting apparatus according to claim 1, wherein said gain adjusting means includes an amplifier and said brightness gain is adjusted by adjusting an amplification degree of said amplifier for amplifying a voltage of image signal.

* * * * *